US012352414B1

(12) United States Patent
Yan

(10) Patent No.: US 12,352,414 B1
(45) Date of Patent: Jul. 8, 2025

(54) WATERPROOF OUTDOOR LAMP AND ASSEMBLING METHOD THEREOF

(71) Applicant: Guohua Yan, Guangxi (CN)

(72) Inventor: Guohua Yan, Guangxi (CN)

( * ) Notice: Subject to any disclaimer, the term of this patent is extended or adjusted under 35 U.S.C. 154(b) by 0 days.

(21) Appl. No.: 19/013,192

(22) Filed: Jan. 8, 2025

(51) Int. Cl.

| | |
|---|---|
| ***F21V 21/002*** | (2006.01) |
| ***F21V 17/12*** | (2006.01) |
| ***F21V 17/16*** | (2006.01) |
| ***F21V 19/00*** | (2006.01) |
| ***F21V 23/06*** | (2006.01) |

(52) U.S. Cl.
CPC ............ *F21V 21/002* (2013.01); *F21V 17/12* (2013.01); *F21V 17/16* (2013.01); *F21V 19/0045* (2013.01); *F21V 23/06* (2013.01)

(58) Field of Classification Search
CPC ........ F21V 21/002; F21V 17/12; F21V 17/16; F21V 19/0045; F21V 23/06
See application file for complete search history.

(56) References Cited

U.S. PATENT DOCUMENTS 6,382,812 B1 * 5/2002 Hsu ........................... F21S 4/10 439/699.1
10,900,656 B1 * 1/2021 Wang ........................ F21V 3/00
2006/0197474 A1 * 9/2006 Olsen ..................... H05B 45/40 315/312
2019/0341718 A1 * 11/2019 Yu ......................... F21V 21/096
2021/0222863 A1 * 7/2021 Xu .......................... F21V 31/00
2022/0260244 A1 * 8/2022 Selak ...................... F21K 9/232
2023/0392776 A1 * 12/2023 Zou ........................ H01R 33/09

FOREIGN PATENT DOCUMENTS

CN 105387390 A * 3/2016
CN 113464853 A * 10/2021
CN 113566140 A * 10/2021
CN 113586985 A * 11/2021

* cited by examiner

*Primary Examiner* — Mary Ellen Bowman
(74) *Attorney, Agent, or Firm* — Daniel M. Cohn

(57) ABSTRACT

A waterproof outdoor lamp easy to assemble and an assembling method thereof are provided. The waterproof outdoor lamp easy to assemble includes a power cord, a lamp holder, an inner plug, a light source, two upper rivets, two lower rivets, and a light bulb. The lamp holder includes a cord connecting portion and an inner plug accommodating portion, the cord connecting portion and the inner plug accommodating portion are integrally injection-molded on the power cord. An inner plug limiting protrusion is disposed on an upper end surface of the inner plug, an inner plug limiting groove is defined on the inner threads of the inner plug accommodating portion, the inner plug limiting protrusion is clamped in the inner plug limiting groove. Compared with conventional outdoor lamps, the waterproof outdoor lamp easy to assemble has better waterproof performance and is also simpler in structure.

11 Claims, 3 Drawing Sheets

WATERPROOF OUTDOOR LAMP AND ASSEMBLING METHOD THEREOF

TECHNICAL FIELD

The present disclosure relates to the field of lighting fixtures, and in particular to a waterproof outdoor lamp easy to assemble and an assembling method thereof.

BACKGROUND

Outdoor decorative light strings are a common decorative element and are widely applied in various settings, such as gardens, camping trips, weddings, and festive celebrations, which aims to create a warm, romantic, and celebratory atmosphere. Since the outdoor decorative light strings are mainly used outdoors and a large quantity of the outdoor decorative light strings are often required for single events, good waterproof performance and convenience of assembly are essential requirements for widespread adoption and practical use of the outdoor decorative light strings.

U.S. parent application Ser. No. 17/469,900 discloses a string lights structure, including a power. The power cord is equipped with a plurality of light bulbs arranged at intervals along the power cord; each of the plurality of light bulbs comprises a cap assembly, a light-emitting light source, and a light-transmitting bulb; the light-emitting light source is provided with an anode terminal and a cathode terminal; the light-transmitting bulb is internally formed with a bulb inner cavity opening upwardly; the cap assembly includes a cap inner core, and a cap encapsulating part formed at a periphery of the cap inner core by overmolding; the cap inner core includes an inner core body, and an inner core top cover arranged at an upper end portion of the inner core body; the power cord is tightly clamped between the inner core body and the inner core top cover; the inner core body is internally provided with a body mounting hole opening downwardly, and is provided with an anode connection terminal and a cathode connection terminal whose lower end portions extend into the body mounting hole, respectively; at upper end portions of the anode connection terminal and the cathode connection terminal are provided with a pointed penetration part protruding upwardly and in a spike shape, respectively; the pointed penetration part of the anode connection terminal penetrates a plastic sheath of the positive lead of the power cord, and is electrically connected to a core of the positive lead; the pointed penetration part of the cathode connection terminal penetrates a plastic sheath of the negative lead of the power cord, and is electrically connected to a core of the negative lead; an upper end portion of the light-emitting light source is embedded in the body mounting hole of the inner core body; the anode terminal of the light-emitting light source is electrically connected to the anode connection terminal, and the cathode terminal of the light-emitting light source is electrically connected to the cathode connection terminal; an upper end portion of the light-transmitting bulb is connected to a lower end portion of the cap encapsulating part, and a lower end portion of the light-emitting light source extends into the bulb inner cavity of the light-transmitting bulb.

This technical solution partially addresses an issue of manufacturing convenience by employing a modular assembly approach, which allows for separate pre-manufacturing of a lamp cap, an inner core assembly, and a light bulb, with final assembly conducted on-site. However, such method requires on-site manual piercing of the power cord by connection terminals for electrical connections, which complicates an assembly process and hinders rapid assembly of the string lights structure. Moreover, in this technical solution, the power cord passes through the lamp cap into the inner core body and is connected to the connection terminals. There is no sealing structure between the power cord and the lamp cap, so that rainwater may potentially enter the inner core body along the power cord when used outdoors, which increases a risk of short circuits in the string lights structure.

U.S. parent application Ser. No. 17/848,509 discloses a novel plug-in string lamp structure, including a string lamp connecting line; the string lamp connecting line is provided with bulb components which are arranged in sequence at intervals along the string lamp connecting line, and each of the bulb components includes a lamp cap, a luminescent light source and a light-transmitting lampshade, respectively; the lamp cap includes a plastic inner core, the plastic inner core is formed with an inner core accommodating cavity, the string lamp connecting wire is provided with a positive lead and a negative lead, a positive contact terminal of the positive lead and a negative contact terminal of the negative lead are located in the inner core accommodating cavity, respectively; the lamp cap further includes a rubber-coated member, and the rubber-coated member is injection-molded into an integrated structure with an upper end of the plastic inner core, an outer surface of the positive lead and an outer surface of the negative lead; the luminescent light source is provided with a light source positive pin and a light source negative pin, the upper end of the luminescent light source is inserted into the inner core accommodating cavity of the plastic inner core, the light source positive pin of the luminescent light source is in contact with and in electric communication with the positive contact terminal of the positive lead, and the light source negative pin of the luminescent light source is in contact with and in electric communication with the negative contact terminal of the negative lead; a plug-in plastic head is provided at the upper end of the luminescent light source, the light-emitting source is plugged and unplugged from the inner core accommodating cavity of the plastic inner core by the plug-in plastic head, and the plug-in plastic head ensures contact stability between the light source positive pin and the positive contact terminal, and between the light source negative pin and the negative contact terminal; a plastic isolation column for isolating the positive lead from the negative lead is further embedded in the inner core accommodating cavity, and the plastic isolation column is located between the positive contact terminal of the positive lead and the negative contact terminal of the negative lead; the upper end of the plastic isolation column is injection-molded into an integrated structure with the rubber-coated member.

In this technical solution, the rubber-coated member of the lamp cap, the upper end of the plastic inner core, the outer surface of the positive lead, an outer surface of the negative lead, and the plastic isolation column are injection-molded into an integrated structure, the positive lead and the negative lead are directly integrated into the string lamp connecting wire, and stable electrical connection between the string lamp connecting wire and the luminescent light source is achieved through the plug-in plastic head and the plastic isolation column, which replaces a conventional method of piercing a corresponding power cord to establish an electrical connection. This method significantly improves waterproofing of the novel plug-in string lamp structure.

However, while this technical solution replaces a piercing method with a plug-in method for the electrical connection between the string lamp connecting wire and the luminescent light source, addition of intermediate components, such as the plug-in plastic head and the plastic isolation column, is further required, the novel plug-in string lamp structure provided by this technical solution has a more complex overall structure.

SUMMARY

The present disclosure aims to provide a waterproof outdoor lamp easy to assemble to solve problems of waterproofing and assembly convenience in conventional outer light strings.

In order to solve above technical problems, the present disclosure provides the waterproof outdoor lamp easy to assemble, including a power cord, a lamp holder, an inner plug, a light source, two upper rivets, two lower rivets, and a light bulb.

The power cord includes a positive lead and a negative lead, each of the positive lead and the negative lead includes a wire and an outer housing, each outer housing encases a corresponding wire.

The lamp holder includes a cord connecting portion and an inner plug accommodating portion, the power cord passes through the cord connecting portion, and the inner plug is accommodated in the inner plug accommodating portion.

The two upper rivets are fixed to the cord connecting portion, and tips of the two upper rivets respectively pierce a corresponding outer housing to be in contact with a corresponding wire.

The two lower rivets and the light source are fixed to the inner plug.

The light source includes a light source pin, the light source pin includes a light source positive electrode pin and a light source negative electrode pin, the two lower rivets are respectively in contact with the light source positive electrode pin and the light source negative electrode pin.

The inner plug is fixed to an interior of the light bulb, the light bulb is connected to the inner plug accommodating portion.

The two upper rivets and the two lower rivets are aligned in a vertical direction, after the waterproof outdoor lamp is assembled, two rivet heads of the two upper rivets are respectively in contact with two rivet heads of the two lower rivets.

Furthermore, two upper rivet positioning holes are defined on an inner side of the cord connecting portion, and the two rivets are respectively disposed in the two upper rivet positioning holes.

Furthermore, the cord connecting portion and the inner plug accommodating portion are integrally injection-molded on the power cord.

Furthermore, the inner plug accommodating portion includes inner threads, and external threads are correspondingly disposed on an exterior of the light bulb.

Furthermore, an inner plug limiting protrusion is disposed on an upper end surface of the inner plug, an inner plug limiting groove is defined on the inner threads of the inner plug accommodating portion, the inner plug limiting protrusion is clamped in the inner plug limiting groove.

Furthermore, a light source pin inserting groove is defined on an upper end of the inner plug, the light source pin is inserted and connected into the light source pin inserting groove.

Furthermore, two lower rivet positioning holes are defined on a side surface of the light source pin inserting groove, the two lower rivets are disposed in the two lower rivet positioning holes.

Furthermore, the inner plug comprises at least one snap-fit protrusion at a lower portion thereof, at least one snap-fit groove is defined in the light bulb, and the at least one snap-fit protrusion is clamped to the at least one snap-fit groove.

The present disclosure further provides an assembling method for assembling the waterproof outdoor lamp easy to assemble as foregoing, including following steps.

S1: forming the lamp holder, where the lamp holder is directly injection-overmolded with polyvinyl chloride (PVC) onto the power cord by an injection molding machine.

S2: pressing the two upper rivets into the lamp holder, where the two upper rivet positioning holes are preset on the lamp holder, the two upper rivets are pressed into the lamp holder respectively through the two upper rivet positioning holes, the outer housing of each of the positive lead and the negative lead is pierced by the two upper rivets to achieve a conductive function.

S3: assembling the light bulb, where the light source pin of the light source is inserted in to the light source pin inserting groove of the inner plug for fixing, the two lower rivets are respectively inserted into the two lower rivet positioning holes of the inner plug for fixing, then the inner plug fixed with the light source and the two lower rivets are clamped and fixed into the light bulb.

S4: connecting the light bulb after assembling to the lamp holder, where the light bulb after assembling is screw-fitted into the lamp holder, the two rivet heads of the two upper rivets are respectively in full contact with the two rivet heads of the two lower rivets for power conduction.

Furthermore, in the S4, clamping the inner plug limiting protrusion into the inner plug limiting groove before connecting the light bulb after assembling to the lamp holder.

Beneficial effects of the present disclosure are as following.

According to the waterproof outdoor lamp easy to assemble of the present disclosure, the lamp holder is integrally injection-molded on the power cord, which effectively prevents rainwater from entering an interior of the lamp holder along the power cord, which greatly reduces a risk of short circuits.

Moreover, the present disclosure only requires the two upper rivets and the two lower rivets to be respectively in contact with the power cord and the light source to achieve the power conduction, which simplifies an overall structure. Furthermore, the inner plug limiting protrusion is disposed on the inner plug, and the inner plug limiting groove is defined on the inner threads of the inner plug accommodating portion, the inner plug limiting protrusion is clamped in the inner plug limiting groove, so that the two upper rivets and the two lower rivets are precisely aligned, which prevents the inner plug from rotating along with the light bulb when the light bulb is screwed into the lamp holder, thereby avoiding misalignment of the two lower rivets with the two upper rivets. In this way, assembly convenience is improved.

BRIEF DESCRIPTION OF DRAWINGS

In order to more clearly illustrate embodiments of the present disclosure or technical solutions in the prior art, drawings required in description of the embodiments or the prior art are briefly described below, and obviously, the drawings in the following description are merely some embodiments of the present disclosure, and for those who skilled in the art, other drawings may be obtained according to these drawings without creative efforts.

Figure 1:
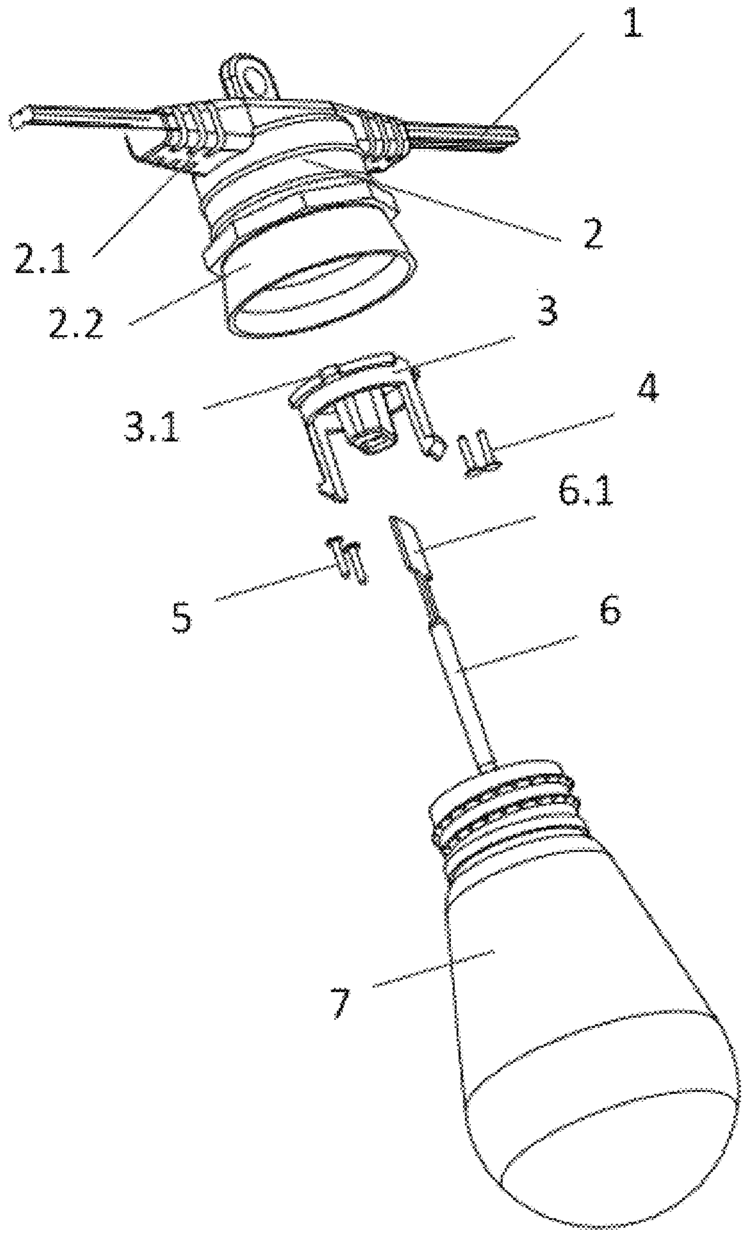
FIG. 1 is an exploded schematic diagram of a waterproof outdoor lamp easy to assemble according to one embodiment of the present disclosure.

Reference numerals in the drawings: 1. power cord; 2. lamp holder; 2.1. cord connecting portion; 2.2. inner plug accommodating portion; 2.3. inner plug limiting groove; 2.4. upper rivet positioning hole; 3. inner plug; 3.1. inner plug limiting protrusion; 3.2. light source pin inserting groove; 3.3. lower rivet positioning hole; 3.4. snap-fit protrusion; 4. upper rivet; 5. lower rivet; 6. light source; 6.1. light source pin; 7. light bulb.

DETAILED DESCRIPTION OF EMBODIMENTS

In order to facilitate understanding of the present disclosure, the present disclosure is described more fully hereinafter with reference to accompanying drawings. Preferred embodiments of the present disclosure are shown in the accompanying drawings. However, the present disclosure may be embodied in many different forms and is not limited to the embodiments described herein. On the contrary, a purpose of providing these embodiments is to make the understanding of the present disclosure more thorough and comprehensive.

It should be noted that when a component is referred to as being “fixed to” another component, it may be directly on another component or intervening components may also be present. When a component is considered to be “connected to” another element, it may be directly connected to another component or intervening component may be present at the same time. Terms “vertical”, “horizontal”, “left”, “right”, and similar expressions used herein are for illustrative purposes only.

Unless otherwise defined, all technical and scientific terms used herein have the same meaning as commonly understood by those who skilled in the art to which the present disclosure belongs. Terminologies used in the specification of the present disclosure is for a purpose of describing particular embodiments only and is not intended to be limiting of the present disclosure. As used herein, terms “and/or” include any and all combinations of one or more associated listing items.

Figure 2:
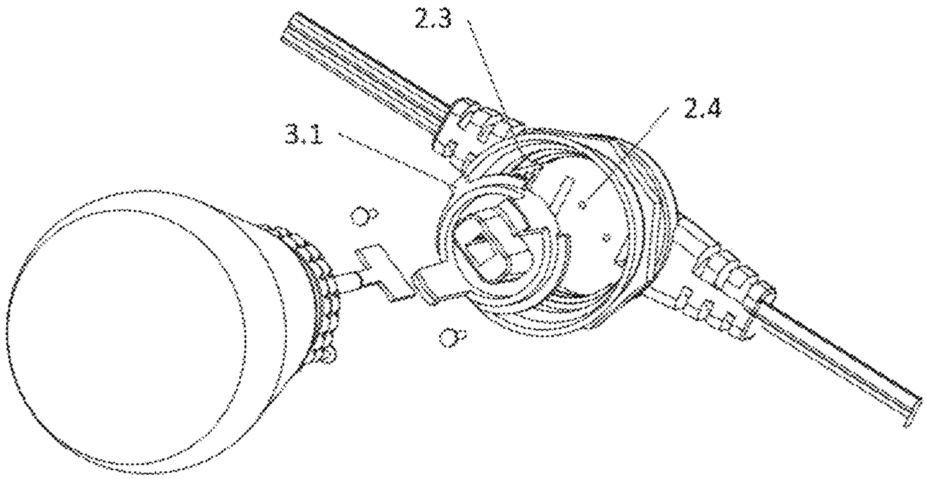
FIG. 2 is an exploded schematic diagram taken from a top view of the waterproof outdoor lamp easy to assemble according to one embodiment of the present disclosure.
Figure 3:
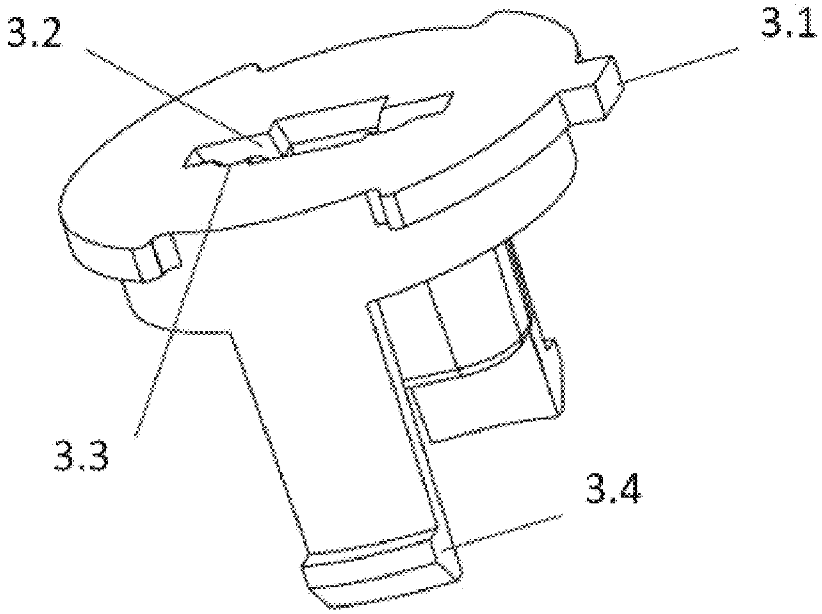
FIG. 3 is a schematic diagram of an inner plug of the waterproof outdoor lamp easy to assemble according to one embodiment of the present disclosure.

Please refer to FIGS. 1-3, the embodiments of the present disclosure provide a waterproof outdoor lamp easy to assemble, including a power cord 1, a lamp holder 2, an inner plug 3, a light source 6, two upper rivets 4, two lower rivets 5, and a light bulb 7.

The power cord 1 includes a positive lead and a negative lead, each of the positive lead and the negative lead includes a wire and an outer housing, each outer housing encases a corresponding wire.

The lamp holder 2 includes a cord connecting portion 2.1 and an inner plug accommodating portion 2.2, the power cord 1 passes through the cord connecting portion 2.1, and the inner plug 3 is accommodated in the inner plug accommodating portion 2.2.

The two upper rivets 4 are fixed to the cord connecting portion 2.1, and tips of the two upper rivets 4 respectively pierce a corresponding outer housing to be in contact with a corresponding wire.

The two lower rivets 5 and the light source 6 are fixed to the inner plug 3.

The light source 6 includes a light source pin 6.1, the light source pin 6.1 includes a light source positive electrode pin and a light source negative electrode pin, the two lower rivets 5 are respectively in contact with the light source positive electrode pin and the light source negative electrode pin.

The inner plug 3 is fixed to an interior of the light bulb 7, the light bulb 7 is connected to the inner plug accommodating portion 2.2.

The two upper rivets 4 and the two lower rivets 5 are aligned in a vertical direction, after the waterproof outdoor lamp is assembled, two rivet heads of the two upper rivets 4 are respectively in contact with two rivet heads of the two lower rivets 5.

In another specific embodiment, two upper rivet positioning holes 2.4 are defined on an inner side of the cord connecting portion 2.1, and the two rivets are respectively disposed in the two upper rivet positioning holes 2.4.

Providing the two upper rivet positioning holes 2.4 is necessary, the two upper rivet positioning holes 2.4 enables the two upper rivets 4 to be easily pressed into the cord connecting portion 2.1 corresponding to the positive lead and the negative lead and precisely pierce the positive lead and the negative lead, in this way, assembly convenience is improved.

In another specific embodiment, the cord connecting portion 2.1 and the inner plug accommodating portion 2.2 are integrally injection-molded on the power cord 1. Through integrally injection-molding an external portion of the power cord 1 with the cord connecting portion 2.1 and the inner plug accommodating portion 2.2, rainwater is effectively prevented from entering an interior of the lamp holder 2 along the power cord 1 to contact pierced portions of the power cord 1, which greatly reduces a risk of short circuits.

In another specific embodiment, the inner plug accommodating portion 2.2 includes inner threads, and external threads are correspondingly disposed on an exterior of the light bulb 7.

In another specific embodiment, an inner plug limiting protrusion 3.1 is disposed on an upper end surface of the inner plug 3, an inner plug limiting groove 2.3 is defined on the inner threads of the inner plug accommodating portion 2.2, the inner plug limiting protrusion 3.1 is clamped in the inner plug limiting groove 2.3. The inner plug limiting protrusion 3.1 is disposed on the inner plug 3, and the inner plug limiting groove 2.3 is defined on the inner threads of the inner plug accommodating portion 2.2, the inner plug limiting protrusion 3.1 is clamped in the inner plug limiting groove 2.3, so that the two upper rivets 4 and the two lower rivets 5 are precisely aligned, which prevents the inner plug 3 from rotating along with the light bulb 7 when the light bulb 7 is screwed into the lamp holder 2, thereby avoiding misalignment of the two lower rivets 5 with the two upper rivets 4. In this way, the assembly convenience is improved.

In another specific embodiment, a light source pin inserting groove 3.2 is defined on an upper end of the inner plug 3, the light source pin 6.1 is inserted and connected into the light source pin inserting groove 3.2.

In another specific embodiment, two lower rivet positioning holes 3.3 are defined on a side surface of the light source pin inserting groove 3.2, the two lower rivets 5 are disposed in the two lower rivet positioning holes 3.3. Preferably, two lower rivet positioning holes 3.3 penetrating through the light source pin inserting groove 3.2, that is, the lower rivet positioning holes 3.3 are two semicircular grooves defined at a side edge of the light source pin inserting groove 3.2 and penetrating through the light source pin inserting groove 3.2, such arrangement manner is more convenient for the two lower rivets 5 to be in contact with the light source pin 6.1.

In another specific embodiment, the inner plug 3 includes at least one snap-fit protrusion 3.4 at a lower portion thereof, at least one snap-fit groove is defined in the light bulb 7, and the at least one snap-fit protrusion 3.4 is clamped to the at least one snap-fit groove. Certainly, in some embodiments, the at least one snap-fit groove is defined at the lower portion of the inner plug 3, and a protrusion is disposed in the light bulb 7, the inner plug 3 is clamped to the light bulb 7 through cooperation between the at least one snap-fit groove and the protrusion. The present disclosure does not limit specific implementations of these features.

Figure 4:
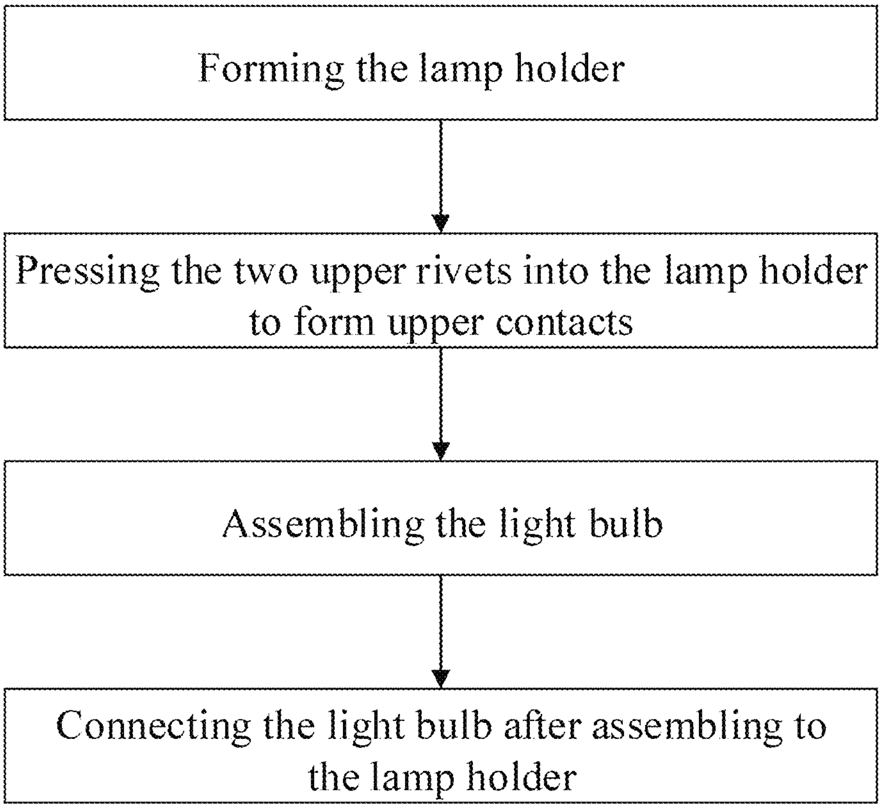
FIG. 4 is a flowchart of an assembling method for assembling the waterproof outdoor lamp easy to assemble according to one embodiment of the present disclosure.

Please refer to FIG. 4, the present disclosure further provides an assembling method for assembling the waterproof outdoor lamp easy to assemble as foregoing, including following steps.

S1: forming the lamp holder, where the lamp holder is directly injection-overmolded with polyvinyl chloride (PVC) onto the power cord by an injection molding machine.

S2: pressing the two upper rivets into the lamp holder to form upper contacts, where the two upper rivet positioning holes are preset on the lamp holder, the two upper rivets are pressed into the lamp holder respectively through the two upper rivet positioning holes, the outer housing of each of the positive lead and the negative lead is pierced by the two upper rivets to achieve a conductive function.

S3: assembling the light bulb, where the light source pin of the light source 6 is inserted in to the light source pin inserting groove of the inner plug for fixing, the two lower rivets are respectively inserted into the two lower rivet positioning holes of the inner plug for fixing, then the inner plug fixed with the light source and the two lower rivets are clamped and fixed into the light bulb.

S4: connecting the light bulb after assembling to the lamp holder, where the light bulb after assembling is screw-fitted into the lamp holder, the two rivet heads of the two upper rivets are respectively in full contact with the two rivet heads of the two lower rivets for power conduction.

In another specific embodiment, in the S4, clamping the inner plug limiting protrusion into the inner plug limiting groove before connecting the light bulb after assembling to the lamp holder.

The above-mentioned embodiments only express several embodiments of the present disclosure, and the description thereof is relatively specific and detailed, but cannot be understood as a limitation on a protection scope of the present disclosure. It should be noted that, for those who skilled in the art, several modifications and improvements may be made without departing from a concept of the present disclosure, which all fall within the protection scope of the present disclosure.

What is claimed is:

1. A waterproof outdoor lamp, comprising:

a power cord;

a lamp holder;

an inner plug;

a light source;

two upper rivets;

two lower rivets; and a light bulb;

wherein the power cord comprises a positive lead and a negative lead, each of the positive lead and the negative lead comprises a wire and an outer housing, each outer housing encases a corresponding wire;

the lamp holder comprises a cord connecting portion and an inner plug accommodating portion, the power cord passes through the cord connecting portion, and the inner plug is accommodated in the inner plug accommodating portion;

the two upper rivets are fixed to the cord connecting portion, and tips of the two upper rivets respectively pierce a corresponding outer housing to be in contact with a corresponding wire;

the two lower rivets and the light source are fixed to the inner plug;

the light source comprises a light source pin, the light source pin comprises a light source positive electrode pin and a light source negative electrode pin, the two lower rivets are respectively in contact with the light source positive electrode pin and the light source negative electrode pin;

the inner plug is fixed to an interior of the light bulb, the light bulb is connected to the inner plug accommodating portion; and the two upper rivets and the two lower rivets are aligned in a vertical direction, after the waterproof outdoor lamp is assembled, two rivet heads of the two upper rivets are respectively in contact with two rivet heads of the two lower rivets.

2. The waterproof outdoor lamp according to claim 1, wherein two upper rivet positioning holes are defined on an inner side of the cord connecting portion, and the two rivets are respectively disposed in the two upper rivet positioning holes.

3. The waterproof outdoor lamp according to claim 1, wherein the cord connecting portion and the inner plug accommodating portion are integrally injection-molded on the power cord.

4. The waterproof outdoor lamp according to claim 1, wherein the inner plug accommodating portion comprises inner threads, and external threads are correspondingly disposed on an exterior of the light bulb.

5. The waterproof outdoor lamp according to claim 4, wherein an inner plug limiting protrusion is disposed on an upper end surface of the inner plug, an inner plug limiting groove is defined on the inner threads of the inner plug accommodating portion, the inner plug limiting protrusion is clamped in the inner plug limiting groove.

6. The waterproof outdoor lamp according to claim 1, wherein a light source pin inserting groove is defined on an upper end of the inner plug, the light source pin is inserted and connected into the light source pin inserting groove.

7. The waterproof outdoor lamp according to claim 6, wherein two lower rivet positioning holes are defined on a side surface of the light source pin inserting groove, the two lower rivets are disposed in the two lower rivet positioning holes.

8. The waterproof outdoor lamp according to claim 6, wherein two semicircular grooves are defined side by side at a side edge of the light source pin inserting groove, and the two semicircular grooves are configured to accommodate the two lower rivets.

9. The waterproof outdoor lamp according to claim 1, wherein the inner plug comprises at least one snap-fit protrusion at a lower portion thereof, at least one snap-fit groove is defined in the light bulb, and the at least one snap-fit protrusion is clamped to the at least one snap-fit groove.

10. An assembling method, for assembling the waterproof outdoor lamp according to claim 1, comprising:

S1: forming the lamp holder, wherein the lamp holder is directly injection-overmolded with polyvinyl chloride (PVC) onto the power cord by an injection molding machine;

S2: pressing the two upper rivets into the lamp holder, wherein two upper rivet positioning holes are preset on the lamp holder, the two upper rivets are pressed into the lamp holder respectively through the two upper rivet positioning holes, the outer housing of each of the positive lead and the negative lead is pierced by the two upper rivets to achieve a conductive function;

S3: assembling the light bulb, wherein a light source pin of the light source is inserted in to a light source pin inserting groove of the inner plug for fixing, the two lower rivets are respectively inserted into two lower rivet positioning holes of the inner plug for fixing, then the inner plug fixed with the light source and the two lower rivets are clamped and fixed into the light bulb;

S4: connecting the light bulb after assembling to the lamp holder, wherein the light bulb after assembling is screw-fitted into the lamp holder, the two rivet heads of the two upper rivets are respectively in full contact with the two rivet heads of the two lower rivets for power conduction.

11. The assembling method according to claim 10, wherein in the S4, clamping an inner plug limiting protrusion into an inner plug limiting groove before connecting the light bulb after assembling to the lamp holder.

* * * * *